United States Patent [19]

Thomas et al.

[11] Patent Number: 4,497,920

[45] Date of Patent: Feb. 5, 1985

[54] SYSTEM FOR BONDING ADDITIVES TO RESIN PARTICLES AND RESULTING COMPOSITION

[75] Inventors: Lowell S. Thomas; William P. Paige, both of Midland, Mich.

[73] Assignee: The Dow Chemical Company, Midland, Mich.

[21] Appl. No.: 450,716

[22] Filed: Dec. 17, 1982

[51] Int. Cl.³ ............................ C08L 5/00; C08J 3/20; C08K 5/49

[52] U.S. Cl. ..................................... 524/57; 524/109; 524/114; 524/119; 524/120

[58] Field of Search ................. 524/57, 109, 114, 119, 524/120

[56] References Cited

U.S. PATENT DOCUMENTS

| | | | |
|---|---|---|---|
| 3,067,153 | 12/1962 | Hock et al. | 524/57 |
| 3,106,477 | 10/1963 | Wright et al. | 524/56 |
| 3,108,977 | 10/1963 | Wolff | 524/56 |
| 3,509,091 | 4/1970 | Cleveland et al. | 524/117 |
| 3,625,877 | 12/1971 | Jackson, Jr. et al. | 524/57 |
| 3,846,360 | 11/1974 | Needham | 524/525 |
| 3,943,080 | 3/1976 | Wismer et al. | 524/44 |
| 3,959,193 | 5/1976 | Putnam et al. | 524/40 |
| 3,978,020 | 8/1976 | Liberti | 524/109 |
| 4,145,329 | 3/1979 | Mark et al. | 524/369 |
| 4,248,744 | 2/1981 | Masar et al. | 524/57 |
| 4,254,014 | 3/1981 | McEwen et al. | 524/811 |
| 4,271,211 | 6/1981 | Knepper | 427/195 |
| 4,312,803 | 1/1982 | Markezich et al. | 524/119 |

FOREIGN PATENT DOCUMENTS 2904356 2/1980 Fed. Rep. of Germany ........ 524/57

Primary Examiner—Morton Foelak
Assistant Examiner—Nathan M. Nutter

[57] ABSTRACT

An additive concentrate composition is composed of a carbonate polymer, a powdered additive such as a pigment, and a mixture of a film-forming adherent such as an esterified polysaccharide and a liquid diluent such as an epoxidized vegetable oil or a bis(phosphorinane), in amounts preferably less than or equal to about 1 percent based on the weight of carbonate polymer and the additive. Alternatively, the epoxidized vegetable oil may optionally be used as a bonding agent.

The bonding agents have desirable properties that do not adversely affect the physical properties of the carbonate polymer in end use, and are thermally stable and color-stable.

9 Claims, No Drawings

SYSTEM FOR BONDING ADDITIVES TO RESIN PARTICLES AND RESULTING COMPOSITION

BACKGROUND OF THE INVENTION

This invention relates to carbonate polymers and more particularly to those carbonate polymers that have powdered additives dispersed therein.

Carbonate polymers derived from reactions of dihydroxyorganic compounds, particularly the dihydric phenols, and carbonic acid derivatives such as phosgene have found extensive commercial application because of their excellent physical properties. These thermoplastic polymers are suitable for the manufacture of molded parts wherein impact strength, rigidity, toughness, heat resistance and excellent electrical properties are required.

The industry often uses concentrates of powdered additive and a carrier resin for introducing said additives to synthetic thermoplastic materials. In these concentrates, carrier resins are intimately blended with large amounts of additives. The carrier resin then acts in the concentrate as a kind of solution promoter between the "dilution" (i.e., thermoplastic) material and additive thereby providing a product with the additive homogeneously dispersed therein.

The making of carrier resin/additive concentrates, which are also called "master batches," is done in a manner similar to the preparation of other thermoplastic resins containing additives except that a particularly high ratio of additive is necessary and the blended material is eventually comminuted to a granulate. It is evident that the use of bonding agents is desirable for bonding such large amounts of additives to the carrier resin of the master batch.

Esterified polysaccharides may be used as bonding agents for mixing carrier resins and powdered additives. However, such a bonding agent causes undesirable yellowing of the resulting blend, and thus adversely affects the reliability of a good color match of thermoplastics prepared in different batches. Further, the esterified polysaccharides are generally difficult to handle at ambient temperatures due to their high viscosities. Heating such additives just prior to blending to lower the viscosity of such agents limits their practical use from the standpoint of handling.

It is therefore desirable to provide efficient, color-stable bonding agents for adhering colorants and other powdered additives to carbonate polymer particles during blending and handling just prior to compounding.

SUMMARY OF THE INVENTION

The present invention is a carbonate polymer composition comprising a carbonate polymer carrier resin having dispersed therein a powdered additive and a color-stable bonding agent consisting essentially of a functionally effective amount of a film-forming adherent and a thermally stable liquid diluent. Hereinafter, such a composition shall be referred to as a concentrate.

The carbonate polymer composition of the present invention exhibits surprisingly color-stable, nondusting, uniform, free-flowing and transportable carbonate polymer/additive blends as compared to prior art compositions employing different diluents. That is, such concentrates exhibit a minimum tendency for additives to undergo gravity separation and sift to the bottom of the handling apparatus.

In general, such concentrates are particularly useful in applications wherein additives such as colorants are desired to be tightly bonded to carrier resin particles such as where the highly efficient and clean use of such additives is desirable.

DETAILED DESCRIPTION OF THE EMBODIMENTS

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl)alkylidenes (often called bisphenol-A type diols) including their aromatically and aliphatically substituted derivatives such as disclosed in U.S. Pat. Nos. 2,999,835; 3,028,365 and 3,334,154; and carbonate polymers derived from other aromatic diols such as described in U.S. Pat. No. 3,169,121. Tetrabromobisphenol-A copolymers may also be employed.

It is understood, of course, that the carbonate polymer may be derived from two or more different dihydric phenols or a copolymer of a dihydric phenol with a glycol or with a hydroxy or acid terminated polyester or with a dibasic acid in the event a carbonate copolymer or interpolymer rather than a homopolymer is desired. Also suitable for the practice of this invention are blends of any one of the above carbonate polymers. Also included in the term "carbonate polymer" are the ester carbonate copolymers of the types described in U.S. Pat. Nos. 3,169,121; 4,330,662 and 4,105,633. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The film-forming adherents of the present invention comprise esterified polysaccharides which are prepared by the controlled esterification of polysaccharides. As used herein, the term "polysaccharide" is a saccharide which, upon hydrolysis, yields more than one monosaccharide residue per molecule. The controlled esterification is accomplished by reacting between one and four of the hydroxyl groups per anhydrosaccharide (i.e., monosaccharide unit), preferably about four, with a lower alkyl-based carboxylic acid. Typical carboxylic acids include acetic acid, propanoic acid, butyric acid, butanoic acid, pentanoic acid and the like, and mixtures thereof. For example, esterified disaccharides are prepared by reacting acetic acid or mixtures of acetic acid and butyric acid with disaccharides such as sucrose, maltose or lactose. Preferred esterified polysaccharides include sucrose octoacetate and sucrose diacetate hexaisobutyrate. Such esterified polysaccharides are extremely viscous and exhibit good film-forming properties. Other less preferred polysaccharides include, for example, esterified cellulose, where the number of hydroxyl groups per four anhydroglucose unit may vary from less than 1 to slightly above 2.

Because of the highly viscous nature of the esterified polysaccharides at room temperature, it is impractical, both from the viewpoint of accurate measurement and of mixing ease, to employ the material in undiluted form. Accordingly, it is advantageous to admix the esterified polysaccharides with a liquid diluent which is compatible with the polysaccharides as well as the carbonate polymer carrier resin. That is, it is desirable that the diluent be unreactive and readily dispersible within the aforementioned adherent and resin, and not decompose or lose its physical properties during processing. Such liquid diluents are quickly absorbed into the carbonate polymer carrier resin and do not significantly interfere with the bonding action of the esterified polysaccharide, the properties of the additive or the properties of the carrier resin. The penetration of the aforementioned liquids into the carrier resin prevents separation of the additives from the resin surface over periods of time. The liquid diluents of this invention are advantageously employed because they are color stable and extend the use of the bonding agents to higher temperatures. That is, the preferred diluents exhibit high processing temperature capabilities and do not undergo color change or exhibit other undesirable degradation reactions at normal carbonate polymer processing temperatures. Further, and importantly, the ability of the liquid diluents to resist degradation at higher temperatures provides a stabilizing effect to the esterified polysaccharide.

An example of suitable diluents includes the epoxidized vegetable oils. The epoxidized vegetable oils of the present invention are esters of glycerine and unsaturated aliphatic carboxylic acids containing most preferably from about 15 to about 25 carbon atoms. Typical unsaturated uncarboxylic acids include palmitic, hexadecanoic, stearic, oleic, linoleic and linolenic acids. Preferred vegetable oils include corn, linseed, cottonseed and soybean oils. Epoxidized vegetable oils are those oils which contain epoxide moieties at the unsaturated sites of the previously mentioned unsaturated carboxylic acids. See, for example, Kirk-Othmer, "Encyclopedia of Chemical Technology," 3rd Ed., A. Whiley, N.Y. (1978).

Examples of other suitable diluents include aromatic bis(dioxaphosphorinanes). The aromatic bis(dioxaphosphorinanes) of the present invention are those dioxaphosphorinanes that are liquids at ambient temperatures and are represented by the formula:

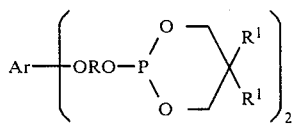

wherein Ar is a divalent aromatic radical having each of its valences on an aromatic ring, R is individually a divalent aliphatic radical and each $R^1$ is individually hydrogen or a monovalent organic radical provided that the aromatic bis(dioxaphosphorinane) is inert to the polycarbonate under conditions of fabrication and use. Exemplary Ar includes phenylene or aromatically substituted phenylene wherein the substituent(s) is halo, alkyl, aryl, amino, etc.; bis(phenylene)alkanes such as 2,2-bis(4-phenylene)propane and halogenated 2,2-bis(4-phenylene)propane; bis(phenylene)oxides and bis(phenylene)sulfides; and the like, with the bis(phenylene)alkanes, especially 2,2-bis(4-phenylene)propane (derived from bisphenol-A), being preferred. Exemplary R includes alkylene, e.g., ethylene and propylene; alkyleneoxyalkylene, alkylenethioalkylene, poly(alkyleneoxy)alkylene, poly(alkylenethio)alkylene, arylene and the like, with alkylene, especially ethylene, being preferred. Exemplary R' includes hydrogen, alkyl, and haloalkyl, with alkyl, especially methyl, being preferred. An example of a preferred aromatic bis(dioxaphosphorinane) includes 2,2'[(1-methylethylidene)-bis(4,1-phenyleneoxy-1,2-ethanediyloxy)]bis(5,5-dimethyl-1,1,3,2-dioxaphosphorinane). Methods of preparation and other exemplary bis(dioxaphosphorinanes) are disclosed in U.S. Pat. No. 4,254,014.

The aliphatic bis(dioxaphosphorinane) is advantageously represented by the formula:

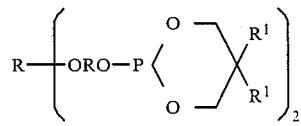

Exemplary R includes alkylene, e.g., ethylene and propylene, alkyleneoxyalkylene, alkylenethioalkylene, poly(alkyleneoxy)alkylene, poly(alkylenethio)alkylene, arylene and the like, or combinations thereof, with alkylene, especially ethylene, being preferred. Exemplary R' includes hydrogen, alkyl and haloalkyl, with alkyl, especially methyl, being preferred.

The bonding agent is prepared by mixing the film-forming adherent with the liquid diluent in amounts sufficient to provide a functionally effective bonding agent when said bonding agent is dispersed with a powdered or crystalline additive in a carbonate polymer carrier resin. Said bonding agent is prepared by mixing about 1 to about 95, preferably about 40 to about 60, weight percent of the film-forming adherent with about 5 to about 99, preferably about 40 to about 60, weight percent of the liquid diluent. Typically, the adherent and diluent may be mixed at room temperature, however, sometimes it may be necessary to slightly heat the viscous adherent to yield a workable liquid solution.

Although much less preferred, it is occasionally desirable to prepare a bonding agent by applying the epoxidized vegetable oil directly to the carbonate polymer carrier resin. This less preferred embodiment of the present invention comprises a carbonate polymer having dispersed therein a powdered additive and an epoxidized vegetable oil.

Typical resin additives which may be dispersed in the carrier resin are desirably finely divided powdered or crystalline species. The powder preferably has a particle size of less than about 50 μm. Smaller particle sizes are preferred because the surface area exposed is greater as particle size decreases. Examples of typical additives include anti-static agents, ultraviolet stabilizers, heat stabilizers, antioxidants, slip agents, anti-block agents, plasticizers, delustrants, flame retardants such as antimony oxide, fillers and extenders such as alumina, silica, clays and calcium carbonate, dispersing agents, surfactants, lubricants such as talc, boron or glass fibers, blowing agents and other adjuvants such as pigments, dyes and colorants.

The pigments used to opacify and color the carbonate polymers are those conventionally known to the skilled artisan for use in high molecular weight thermoplastic pigmentation. Examples of inorganic pigments include titanium dioxide, lithopone, zinc sulfide, antimony trioxide, cadmium reds, titanium yellow, cadmium yellow, iron oxides, chrome oxide green, ultramarine blue, carbon blacks, and the like. The organic pigments include examples such as quinacridone, anthraquinone, and phthalocyanine, and derivatives of the generic compounds and metal derivatives thereof.

The concentrate of the present invention is prepared by combining the carbonate polymer carrier resin with an effective amount of the bonding agent and additive using any one of a variety of blending procedures conventionally employed for incorporating additives into carbonate polymer carrier resins. For example, dry particulates of the carbonate polymer and the bonding agent may be dry blended, then dry blended with powdered pigment, and the resulting blend extruded to the desired shape.

While any amount of bonding agent will impart to the carbonate polymer an improvement to dispersion and provide a system comprising a well-bound additive such as a pigment, preferred amounts of the bonding agent are in the range from about 0.05 to about 1, especially about 0.1 to about 0.5 weight percent based on the weight of the carbonate polymer. The desirable physical properties of the carbonate polymer are effected to a very minimum extent when the bonding agent is added at low levels of less than about 0.5 percent based on the weight of the carbonate polymer.

Bonding agent blend levels of about 0.1 percent or less are most desirable in finished carbonate polymer products. While bonding agent blend levels of 1 percent or greater in molded, finished carbonate polymer products are very unlikely, these usage levels would be quite typical in the manufacture of color concentrates for letdown in dilution resins. In these applications, retention of such properties of yellowness index and melt flow in the base resin is very important in maintaining good quality control of the concentrate. Thus, the selection of such a suitable bonding agent to achieve resin stability is quite critical. This invention exemplifies the technology for producing reliable and efficient preparation of concentrates which are further letdown in dilution resins in typical amounts of, for example, about 10:1 to about 30:1. For a bonding agent system of about 1 percent, the powdered additive is preferably present in an amount from about 1 to about 70, preferably about 1 to about 40, percent based on the total weight of the bonding agent, additive and carbonate polymer. It is understood that greater amounts of bonding agent may be used for various types of additives and for higher additive loadings. For example, with bonding agent concentrations greater than about 1 weight percent, pigment concentrations of up to about 60 percent based on the weight of the carbonate polymer carrier resin, bonding agent and pigment are possible.

Addition of up to about 1 weight percent of bonding agent (based on the weight of the bonding agent and carrier resin) does not detrimentally affect the impact, tensile, heat resistant and flammability properties of the carbonate polymer when such a concentrate is processed under typical conditions. However, the melt flow of the carbonate polymer is improved (i.e., lowered) without the introduction of deleterious effects by the bonding agent when the esterified polysaccharide/bis(dioxaphosphorinane) bonding agents are blended with the carbonate polymer. This indicates a plasticizing effect provided by the bis(dioxaphosphorinanes). However, it is observed that the epoxidized vegetable oils and epoxidized vegetable oils/esterified polysaccharide bonding agent systems provide a negligible effect upon the melt flow of the carbonate polymer when blended with said carbonate polymer. This is believed to be due to a lesser plasticizing effect exhibited by such bonding agents.

The yellowing and transmittance properties of the carbonate polymer carrier resins are very slightly affected by the addition of said bonding agents. However, the haze of such a concentrate is observed to increase with increasing amount of bonding agent in the blend. This increase in haze is significant for products in which transparency is desired, but for practical applications, high amounts of bonding agents are used with additive loadings (e.g., such as pigments) where end products are opaque. Transparent colored products are generally made with additives well below 1 percent additive content, at which concentration a bonding agent is generally not required.

Besides the ease of handling and control of yellowing (i.e., color stability) provided to carbonate polymer/additive blends by such bonding agents, such concentrates also exhibit greatly reduced dusting. This is an important consideration when handling, for example, colorant blends in an open area where airborne pigment can contaminate other compounded products.

The following examples are given to further illustrate the invention and should not be considered as limiting the scope thereof. In the following examples, all parts and percentages are by weight unless otherwise indicated.

EXAMPLE 1

To a 3000-g sample of a homopolycarbonate of bisphenol-A, having a weight average molecular weight ($M_w$) of about 33,000 as determined by gel permeation chromatography and sold under the trade name, Merlon M50F-1000 by Mobay Chemical, in the form of pellets (0.32 cm (dia.) by 0.32 cm (length)) is added 30 g of a bonding agent mixture composed of 15 g of sucrose diacetate hexaisobutyrate (SAIB) (sold commercially as SAIB-100 by the Eastman Chemical Products Co.), and 15 g of epoxidized soybean oil (ESBO) which is sold under the trade name Scraplube by Kohnstamm and Co., Inc. The bonding agent mixture is in liquid form and is obtained by heating the two components to about 150° F. to provide a mixture of a viscosity low enough to pour. The carbonate polymer/bonding system is then thoroughly tumble blended. The samples are thoroughly dried at 250° F. for about 4 hours and are immediately extruded and repelletized in a single screw extruder equipped with a static mixer and operating at 525° F. The extruded pellets are redried at 250° F. for up to 4 hours. The redried pellets are molded to test bars (2 in (dia.)×⅛ in (length)) using a screw type injection molding unit wherein the molding temperature is 575° F. for all zones and the mold temperature is 175° F. The injection molded bars are tested for impact resistance, melt flow and optical properties. Samples prepared in this manner are designated Sample No. 1.

EXAMPLE 2

In a manner described in Example 1, the carbonate polymer pellets are mixed with bonding agent mixtures composed of SAIB and a bisphenol-A base cyclic diphosphite such as 2,2'[(1-methylethylidene)-bis(4,1-phenyleneoxy-2,1-ethanediyloxy)]bis(5,5-dimethyl-1,3,2-dioxaphosphorinane). The bonding agent mixture is in liquid form and is obtained by heating the two components to about 250° F. for about 10 minutes. The polycarbonate/bonding system is blended, dried and extruded as described in Example 1. Samples prepared in this manner are designated Sample No. 2.

EXAMPLE 3

In a manner described in Example 2, the carbonate polymer pellets are mixed with an aliphatic bis(dioxaphosphorinane) such as 2,2'-(1,2-ethanediylbis(oxy-2,1-ethanediyloxy))bis(5,5-dimethyl-1,3,2-dioxaphosphorinane). Samples prepared in this manner are designated Sample No. 3.

EXAMPLE 4

The polycarbonate and bonding agent are mixed, tumble blended and dried as described in Examples 1, 2 and 3, respectively. Small 500-g size samples of 79 percent polycarbonate pellets, 1.0 percent bonding agent and 20 percent $TiO_2$ pigment sold commercially as TRI-PURE R-101 by E. I. du Pont de Nemours & Co. are used. The pellet/bonding agent is mixed with a bread type mixer and transferred to a one-gallon metal can of known weight. The $TiO_2$ is added to the metal can and tumble blended for about 30 minutes. After blending, the contents are poured into a number 10 sieve, and the emptied can is weighed to determine the amount of the pigment and bonding agent retained on the walls. The sieve assembly with contents, cover and bottom tray are thoroughly shaken by hand and bounced vigorously about 20 times on a table top for about 1 minute. This exercise provides a relative measure of the weight of pigment that can be shaken off the pellets with rather severe agitation. The weight of residue in the bottom of the sieve assembly after this shaking history is determined.

The weights of residue in the cans after tumble blending and the residue remaining in the bottom of the sieve assembly after shaking are used as a relative comparison of efficiency of the bonding agents in adhering pigment to resin pellets and are shown in Table I.

TABLE I

| Sample | Description | Amount of Original Pigment Lost (grams) | | |
|---|---|---|---|---|
| | | Blending Step | Shaking Step | Total Lost |
| A* | PC[1] | 3.9 | 7.2 | 11.1 |
| B* | PC[1] | 4.4 | 6.7 | 11.1 |
| C* | + 1% SAIB | 1.5 | 2.2 | 3.7 |
| D* | + 1% SAIB/DAO[2] (50/50) | 1.0 | 1.7 | 2.7 |
| 1 | + 1% SAIB/ESBO (50/50) | 0.8 | 0.9 | 1.7 |
| 2 | + 1% SAIB/ArBD[3] (50/50) | 2.5 | 0.8 | 3.3 |
| 3 | + 1% SAIB/AlBD[4] (60/40) | 0.8 | 1.0 | 1.8 |
| 4 | + 1% ESBO[5] | 1.3 | 1.0 | 2.3 |

*A, B, C and D are reference standards and are not intended as examples of this invention.
[1]PC is polycarbonate and as used throughout is a reference standard.
[2]DAO is dioctyl adipate and is used as a diluent. The SAIB/DAO sample is tested for comparison purposes, and is not an illustration of the invention because of the relative thermal instability as shown in Table V.
[3]ArBD is the aromatic bis(dioxaphosphorinane).
[4]AlBD is the aliphatic bis(dioxaphosphorinane).
[5]ESBO is epoxidized soybean oil and is used as a bonding agent without adding SAIB.

As evidenced by the data shown in Table I, the mixtures of SAIB and ESBO with the polycarbonate increase the efficiency of adhering the pigment to the polycarbonate sample. In addition, the 1 percent SAIB/ESBO, 50/50 mixture (Sample No. 1) is observed to be the most effective bonding agent.

As illustrated by Sample No. C, an adherent is not observed to be as effective a bonding agent if a diluent is not present. Sample No. A illustrates that the amount of pigment lost is substantial if no bonding agent is employed, and also illustrates the reproducibility of this test.

EXAMPLE 5

Carbonate polymer blends are prepared using methods similar to those described in Example 1 except that blends containing less than 1 percent bonding agent are prepared. Such samples are designated Sample Nos. 1A, 1B and 1C, respectively. Additionally, small amounts of ESBO diluent are blended with carbonate polymer samples in a like manner. Such samples are designated Sample Nos. 4A, 4B and 4C, respectively.

The impact strengths of the carbonate polymer blends are examined using the notched Izod impact test. Results are presented in Table II.

TABLE II

| Sample | Description | Notched Izod[1] Impact (Ft-lb/in.) |
|---|---|---|
| A* | PC-Test | 17.9 (0)[2] |
| 4A | + .05% ESBO | 16.8 (0) |
| 4B | + .10% ESBO | 17.1 (0) |
| 4C | + .50% ESBO | 17.4 (0) |
| 4 | + 1.00% ESBO | 17.5 (0) |
| 1A | + .05% SAIB/ESBO[3] | 17.6 (0) |
| 1B | + .10% SAIB/ESBO | 17.3 (0) |
| 1C | + .50% SAIB/ESBO | 17.3 (0) |
| 1 | + 1.00% SAIB/ESBO | 18.0 (0) |

*Not an example of the invention.
[1]Tests are performed in accordance with ASTM D-256.
[2](0) represents the number of brittle failures per 8 specimens tested.
[3]A 50/50 weight ratio of SAIB to ESBO.

The various carbonate polymer blends show no significant effect on impact properties of the carbonate polymer.

EXAMPLE 6

Samples are prepared and molded as taught in Example 1 and designated as in Example 5. They are allowed to age in an oven at about 140° C. for a 21-day period. Optical properties such as the yellowing index and percent transmittance are measured at time 0, and after 7, 14 and 21 days. Yellowness index data is measured and presented in Table III.

TABLE III

| Sample | Description | Yellowness Index[1] Days Aged | | | |
|---|---|---|---|---|---|
| | | 0 | 7 | 14 | 21 |
| A* | PC-Test | 4.4 | 5.2 | 5.9 | 5.9 |
| 1A | + 0.05% SAIB/ESBO | 5.2 | 5.7 | 6.3 | 6.4 |
| 1B | + 0.10% SAIB/ESBO | 5.2 | 5.6 | 6.1 | 6.1 |
| 1C | + 0.50% SAIB/ESBO | 5.0 | 4.9 | 6.1 | 6.3 |
| 1 | + 1.00% SAIB/ESBO | 4.6 | 4.7 | 6.2 | 7.0 |
| 4A | + 0.05% ESBO | 5.1 | 4.8 | 5.6 | 5.9 |
| 4B | + 0.10% ESBO | 4.7 | 4.3 | 5.2 | 5.5 |
| 4C | + 0.50% ESBO | 4.2 | 3.9 | 5.4 | 6.3 |
| 4 | + 1.00% ESBO | 3.9 | 4.4 | 6.6 | 8.6 |

*Not an example of the invention.
[1]All tests performed in accordance with ASTM D-1003-61 and D-1925-70 and are measured using a Hunter Lab, Model D-25 Optical Sensor.

The yellowness index increases very slightly over time for small (i.e., <0.5 percent) amounts of carbonate polymer samples containing SAIB/ESBO and ESBO additives. The SAIB/ESBO mixture produces a smaller change in yellowness relative to the unaged control at higher levels of addition (i.e., 1 percent).

Similar tests for measuring the light transmittance of the samples indicate no significant change in the percent transmittance in any of the samples.

EXAMPLE 7

Melt flow properties are tested on samples which are prepared as taught in Example 1 and designated as in Example 5 except that ⅜ inch diameter melt flow slugs are molded rather than bars and discs. The results are shown in Table IV.

TABLE IV

| | | Melt Flow Data (g/10 min.)[1] Days Aged at 140° C. | | | |
|---|---|---|---|---|---|
| Sample | Description | 0 | 7 | 14 | 21 |
| A* | PC-Test | 4.48 | 4.27 | 4.50 | 4.54 |
| 1A | + 0.05% SAIB/ESBO | 4.27 | 4.27 | 4.29 | 4.44 |
| 1B | + 0.10% SAIB/ESBO | 4.34 | 4.14 | 4.28 | 4.24 |
| 1C | + 0.50% SAIB/ESBO | 4.67 | 4.59 | 4.88 | 4.85 |
| 1 | + 1.00% SAIB/ESBO | 5.01 | 5.09 | 5.77 | 5.96 |
| 4A | + 0.05% ESBO | 4.09 | 4.19 | 4.33 | 4.54 |
| 4B | + 0.10% ESBO | 4.21 | 4.21 | 4.30 | 4.43 |
| 4C | + 0.50% ESBO | 4.84 | 4.95 | 5.33 | 5.81 |
| 4 | + 1.00% ESBO | 5.25 | 5.42 | 6.12 | 6.71 |

*Not an example of the invention.
[1]Measurements made in accordance with ASTM D-138, Condition O, 300° C., 1200 g.

The samples containing 0.05 percent ESBO or SAIB/ESBO or less are observed to undergo no significant increase in melt flow over the 21-day period. At 1 percent, the sample containing the SAIB/ESBO (Sample No. 1) is observed to undergo less change in melt flow properties than the sample containing ESBO (Sample No. 4) over the same period. As evidenced by the data shown in Table V, the bonding agents such as SAIB/ESBO and ESBO do not significantly affect the melt flow properties of the polycarbonate when employed in amounts less than 1 percent.

EXAMPLE 8

Carbonate polymer blends are prepared as described in Examples 2 and 3 except that blends containing less than 1 percent bonding agent are prepared. Such samples are designated Sample Nos. 2A and 3A, respectively. Bonding agent/carbonate polymer blends are prepared for other samples for comparison purposes. Such bonding agents include SAIB (Sample Nos. $C_1$ and C) and a SAIB/DOA mixture (Sample Nos. $D_1$ and D) where DOA is dioctyl adipate and is a known diluent. Impact, yellowness and melt flow tests are measured as per Examples 5, 6 and 7, respectively. The results are presented in Table V.

TABLE V

| Sample | Description | N.I. Impact Strength[1] | Melt Flow[2] | Y.I.[3] |
|---|---|---|---|---|
| A* | PC-Test | 18.52 | 4.21 | 3.10 |
| $C_1$* | + 0.10% SAIB | 18.20 | 4.31 | 5.90 |
| C* | + 1.0% SAIB | 17.15 | 4.64 | 9.05 |
| $D_1$* | + 0.01% SAIB/DOA | 17.59 | 4.47 | 4.20 |
| D* | + 1.0% SAIB/DOA | 17.79 | 5.01 | 8.35 |
| 2A | + 0.1% SAIB/ArBD | 19.05 | 4.12 | 4.10 |
| 2 | + 1.0% SAIB/ArBD | 18.70 | 10.56 | 5.00 |
| 3A | + 0.1% SAIB/AlBD | 19.58 | 5.03 | 3.70 |
| 3 | + 1.0% SAIB/AlBD | 17.45 | 12.99 | 5.40 |

*Not examples of the invention, but provided for comparison purposes.
[1]Notched Izod Impact is measured in ft-lb/in in accordance with ASTM D-256.
[2]Melt flow is presented in g/10 min. in accordance with ASTM D-1238, Condition O, 300° C., 1200 g.
[3]Y.I. is yellowness index and is performed in accordance with ASTM D-1003-61 and D-1925-70.

Small amounts of bonding agent additive do not adversely affect the impact properties of the carbonate polymer. In fact, small amounts of the bis(dioxaphosphorinanes) are observed to increase the impact properties of the carbonate polymer (Sample Nos. 1A, 2, 3A and 3). Small amounts of the bis(dioxaphosphorinane) bonding agents do not significantly affect the melt flow of the sample. However, at a 1 percent level, the melt flow increases about 2.5 to 3 times (Sample Nos. 2 and 3). The bis(dioxaphosphorinane)/carbonate polymer blends also exhibit less yellowing as compared to the other samples. The bis(dioxaphosphorinanes) exhibit a less critical affect on the critical physical properties of the polycarbonate resin, have less tendency to yellow, especially at higher levels of addition, and are easiest to handle.

What is claimed is:

1. A carbonate polymer composition in the form of an additive concentrate comprising a carbonate polymer carrier resin having dispersed therein a powdered or crystalline additive and a functionally effective amount of a color and heat stable bonding agent comprising a mixture of
   (a) an epoxidized vegetable oil or a bis(dioxaphosphorinane), and
   (b) an esterified polysaccharide.

2. A composition of claim 1 wherein said powdered or crystalline additive is a pigment.

3. A composition of claim 1 wherein said epoxidized vegetable oil is an epoxidized soybean oil.

4. A composition of claim 1 wherein said bis(phosphorinane) is 2,2'[(1-methylethylidene)-bis(4,1-phenyleneoxy-2,1-ethanediyloxy)]bis(5,5-dimethyl-1,3,2-dioxaphosphorinane).

5. A composition of claim 1 wherein said bis(phosphorinane) is 2,2'-(1,2-ethanediylbis-(oxy-2,1-ethanediyloxy))bis(5,5-dimethyl-1,3,2-dioxaphosphorinane).

6. A composition of claim 1 wherein the amount of said bonding agent contained in said composition is less than or about equal to 1 weight percent.

7. A composition of claim 1 wherein the amount of said powdered additive contained in said composition is between about 1 and about 60 weight percent.

8. A composition of claim 1 wherein said esterified polysaccharide is sucrose hexaacetate diisobutyrate.

9. A process for preparing an additive concentrate which comprises dry blending a powdered or crystalline additive and a dry particulate of carbonate polymer in the presence of a functionally effective amount of a color and heat stable bonding agent comprising a mixture of
   (a) an epoxidized vegetable oil or a bis(dioxaphosphorinane), and
   (b) an esterified polysaccharide.

* * * * *